March 4, 1952   M. CONRAD   2,587,697
APPARATUS FOR TESTING AMPLIFIERS
Filed Oct. 28, 1949

INVENTOR.
Matthew Conrad
BY J. L. Bowes
ATTY.

Patented Mar. 4, 1952

2,587,697

UNITED STATES PATENT OFFICE 2,587,697

APPARATUS FOR TESTING AMPLIFIERS

Matthew Conrad, Philadelphia, Pa., assignor to Stromberg-Carlson Company, a corporation of New York Application October 28, 1949, Serial No. 124,160

2 Claims. (Cl. 179—171)

This invention relates to methods and apparatus for testing amplifiers, more particularly to methods and apparatus for measuring amplifier characteristics or quantities and determining the conditions or adjustments necessary to obtain optimum amplifier characteristics, and the invention has for an object the provision of improved methods and apparatus for obtaining direct measurements and indications of the above character.

It has heretofore been the practice, in order to obtain a measure of the power gain of an amplifier, to measure two or more quantities or characteristics of the amplifier at both the input and the output side, for example, the impedance, the complex voltage or the complex current, and then to compute the power gain from the measured quantities. It has also been proposed to employ wattmeters for effecting power measurements at both the input and output of the amplifier and then to compute the power gain as the ratio of the separately measured input and output power values. Such prior methods, however, do not provide a direct measurement or reading of the power gain of an amplifier, but instead require computation from two or more measured quantities. Accordingly it is a further object of the present invention to provide improved methods and apparatus for directly measuring the power gain of an amplifier.

It is another object of the invention to provide a method and apparatus for directly indicating, by the setting of an adjustable component of the testing circuit, the value of the desired characteristic of an amplifier undergoing test.

It is still another object of the invention to provide improved methods and apparatus for testing amplifiers of the semi-conductor type.

A still further object of the invention is the provision of direct indications of the characteristics of a semi-conductor amplifier during adjustment of the physical parameters thereof.

In carrying out the invention and practicing the method thereof, use is made of the fact that in a feed-back oscillator which is on the verge of oscillation, the power gain in the amplifier portion of the oscillator must be equal to the power loss in the feed-back circuit. Accordingly, in accordance with the present invention the amplifier to be tested is connected in a feed-back circuit including means for adjusting the power loss therein and means are provided for detecting the onset or cessation of oscillations as the power loss is varied, whereby the setting of the adjusting means affords a direct indication of the power gain of the amplifier under test. Furthermore, input and output impedance values of the amplifier may be directly indicated as the setting of impedance matching networks such as adjustable coupling transformers, for example, forming a part of the feed-back circuit.

For a more complete understanding of the invention reference should now be had to the drawing, in which.

Figure 1:
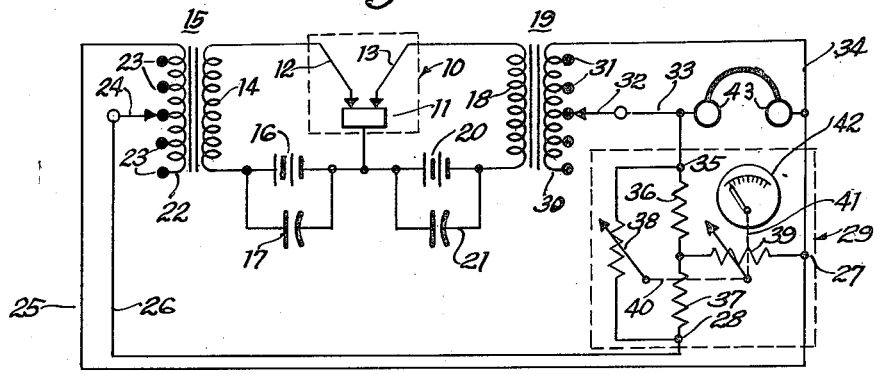
Fig. 1 is a circuit diagram of an amplifier testing apparatus embodying the invention and capable of use in carrying out testing methods embodying the invention.

Referring now to Fig. 1 of the drawing, the invention, while not limited thereto, is particularly applicable to and has been shown as embodied in apparatus for testing semi-conductor triodes or amplifiers of the type known as transistors, the construction and operating characteristics of which are described in an article appearing at pages 68 to 70, inclusive, of the September, 1948, issue of Electronics, published by McGraw-Hill Publishing Co., 330 West 42d Street, New York, New York. As shown diagrammatically in Fig. 1, the semi-conductor triode or amplifier 10 to be tested comprises a suitable crystal or germanium block 11, one surface of which is adapted to be engaged by an emitter electrode 12 and a collector electrode 13. The input circuit for the amplifier 10 extends from the emitter electrode 12, through the secondary winding 14 of a suitable coupling transformer 15 and a source of bias voltage represented by a battery 16, to the opposite surface of the germanium crystal 11, a suitable by-pass condenser 17 being provided for the battery 16. Likewise the output circuit for the amplifier 10 extends from the collector electrode 13, through the primary winding 18 of a suitable coupling transformer 19, and by way of a suitable source of bias potential represented by a battery 20 to the germanium crystal 11, a by-pass condenser 21 likewise being provided for the battery 20.

In accordance with the present invention, the coupling transformers 15 and 19 are arranged to couple the input and output circuits of the amplifier 10 in a feed-back circuit, the primary winding 22 of the coupling transformer 15 being provided with a plurality of taps 23 adapted to be engaged by a movable tap connector 24 and the effective portion of the primary winding 22 being connected through suitable conductors 25 and 26 to a pair of terminals 27 and 28 of a suitable attenuator 29, which is illustrated as being of the bridged T type, the terminal 27 being common to the input and output circuits of the attenuator. Similarly, the secondary winding 30 of the coupling transformer 19 is provided with suitable taps 31 for engagement with a movable tap connector 32, and the effective portion of the winding 32 is connected through suitable conductors 33 and 34 to an input terminal 35 and the common terminal 27 of the attenuator 29.

As shown, the attenuator 29 comprises a pair of fixed resistors 36 and 37 and a pair of adjustable resistors 38 and 39 which are ganged, as indicated by the broken line 40, for simultaneous adjustment, and in accordance with the present invention the adjustment elements of the ganged resistors 38 and 39 are connected, as indicated diagrammatically by the broken line 41, to a suitable indicator 42 which thereby serves to indicate continuously the adjustment of the attenuator 29. Associated with the feed-back circuit is an oscillation detector, which may be of any suitable type capable of detecting the onset or cessation of oscillations in the feed-back circuit, and which is illustrated in Fig. 1 as comprising a pair of head phones 43 connected as shown between the conductors 33 and 34 of the feed-back circuit.

In accordance with the present invention, the amplifier 10 to be tested is connected in the feed-back circuit, and the attenuator 29 may thereupon be adjusted to vary the power loss in the feed-back circuit. The polarity of the coupling transformers 15 and 19 is so chosen that feed-back will be positive in the middle of the pass band of the transformers, and, assuming that the circuit is so adjusted that the amplifier 10 provides a power gain somewhat greater than one between its input and output terminals with the attenuator set at a high value of attenuation, the attenuator setting may then be varied from its high value toward lower values of attenuation, and the circuit will break into oscillation when the sum of the attenuator and transformer power losses becomes equal to the gain of the triode 10. The point of onset of oscillation may be detected by the detector means 43 and the indicator means 42 will give a direct reading of the setting of the attenuator at that instant. The meter 42 may be calibrated in terms of the amplifier characteristic being tested, i. e., in terms of power gain, and accordingly a direct measurement of the power gain of the amplifier 10 is obtained.

In addition to direct measurement of the power gain of the amplifier as heretofore described, the testing apparatus shown in Fig. 1 may be employed to determine directly the maximum available power gain of the amplifier 10 under optimum impedance matching conditions for various adjustments of the biasing potential supplied by the batteries 16 and 20. This characteristic of the amplifier may be determined simply by adjusting the taps on the transformers 15 and 19 until the point of adjustment is reached at which oscillation will occur at the highest setting of the attenuator 29. Such direct measurement of the maximum available power gain may be employed as a guide in making adjustments of the physical parameters of the semi-conductor amplifier 10, such, for example, as electrode pressure, electrode spacing, degree of exposure to radiation, etc.

Figure 2:
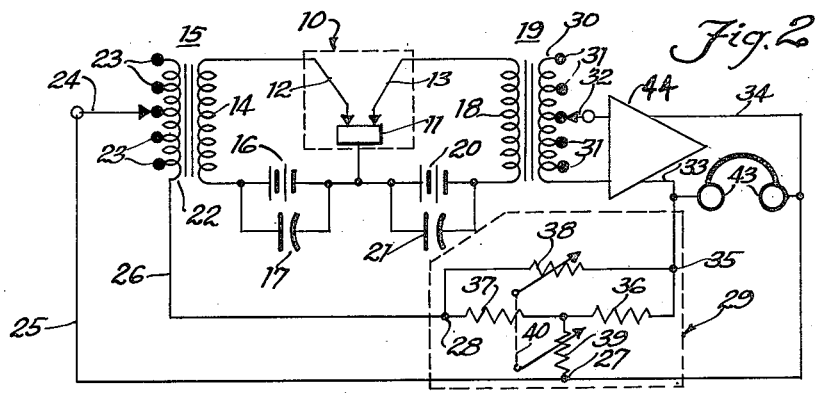
Fig. 2 is a circuit diagram similar to Fig. 1 but illustrating an embodiment of the invention wherein increased accuracy of measurement may be obtained.

In Fig. 2 a modified testing circuit embodying the invention is shown which is in all respects similar to the circuit of Fig. 1 except that a suitable power amplifier 44 is provided between the secondary winding 30 of the transformer 19 and the input terminals 35 and 27 of the attenuator 29. By proper adjustment of the amplifier 44, power losses in the coupling transformers 15 and 19 may be properly compensated so as to increase the accuracy of the power gain measurement that is obtained by adjusting the attenuator 29 and noting the setting thereof at the point of transition between oscillatory and non-oscillatory condition. Inasmuch as the remaining parts of the apparatus shown in Fig. 2 are identical with Fig. 1, similar reference numerals have been applied and further description thereof is thought to be unnecessary.

Figure 3:
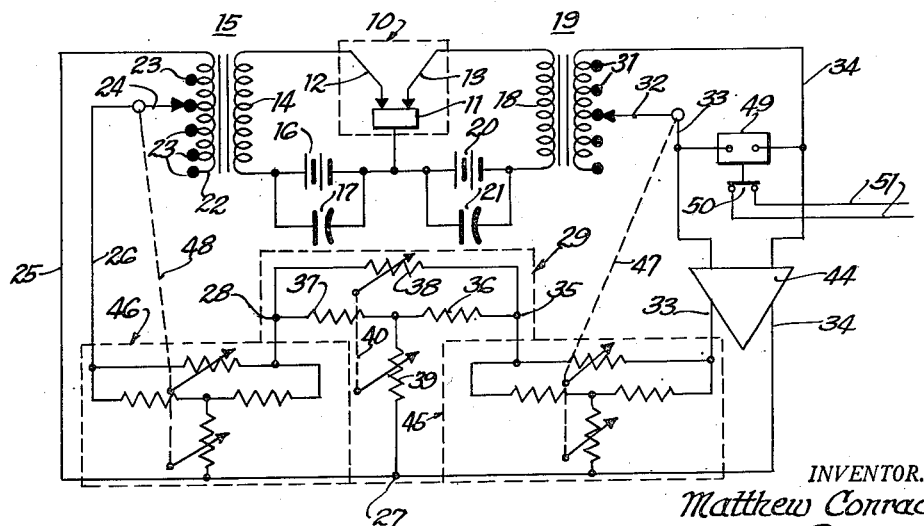
Fig. 3 is a circuit diagram similar to Figs. 1 and 2 but illustrating a still further refinement of the measuring apparatus illustrated in Figs. 1 and 2.

In the circuit of Fig. 2, the compensation provided by the amplifier 44 is obtained only on an average basis, since the power loss occurring in the coupling transformers 15 and 19 varies with the adjustment thereof, and in Fig. 3 a further embodiment of the invention is illustrated wherein proper compensation may be made for the power loss in the coupling transformers 15 and 19 for each of the adjusted positions thereof provided by the taps 23 and 31. Thus, as shown in Fig. 3, the feed-back circuit provided by the coupling transformers 15 and 19 includes not only the calibrated adjustable attenuator 29 and the amplifier 44, but likewise includes additional attenuators 45 and 46 which are respectively connected between the amplifier 44 and the terminals 27 and 35 of the attenuator 29, and between the attenuator terminals 27 and 28 and the primary winding 23 of the coupling transformer 15. These additional attenuators 45 and 46 are illustrated as being of the bridged T type similar to the attenuator 29, and in accordance with the present invention, the adjustable attenuator 45 is ganged, as indicated by the broken line 47, with the adjustable tap connector 32 of the coupling transformer 19, while the attenuator 46 is ganged, as indicated by the broken line 48, with the adjustable tap connector 24 of the transformer 15. It will thus be apparent to those skilled in the art that by proper adjustment of the attenuators 45 and 46 so as to provide the highest attenuation when the transformers 15 and 19 are adjusted to provide the lowest power loss, the attenuation provided by the attenuators 45 and 46 will be automatically decreased each time that the coupling transformers are adjusted to a position of increased loss, whereby the power loss of the transformers at each possible position of adjustment is automatically compensated.

In accordance with the present invention, the onset or cessation of oscillation in the circuit, as the ratio of the power gain of the amplifier to the power loss in the feed-back circuit varies, may be employed to control the operation of automatic adjustment machinery in the manufacture of amplifiers of the semi-conductor type. For example, it is known that exposure to radiation resulting from nuclear processes may be employed to reduce the gain of a semi-conductor amplifier. Accordingly, if the amplifier 10, after being connected in the circuit of Fig. 3, is exposed to such radiation, the circuit having initially been adjusted for oscillation, the cessation of oscillations in the feed-back circuit may be employed to effect automatic termination of the radiation when a certain prescribed power gain is reached. For example, the cessation of oscillations in the feedback circuit may be employed to operate a relay connected for energization therefrom, and in Fig. 3 the oscillation detector, which is represented by the head phones 43 in Figs. 1 and 2, takes the form of a suitable relay 49 which is connected across the feed-back conductors 33 and 34 and is provided with suitable contacts 50 adapted to control a suitable control circuit represented by the conductors 51. The relay 49 may be of any suitable type adapted to open and close its contacts upon the cessation or onset of oscillations in the feed-back circuit, and the control circuit 51 may include any suitable means adapted, upon operation of the contacts 50, to terminate the irradiating operation, as, for example, by operating a solenoid to interpose a shield between the radiation source and the amplifier 10.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent is:

1. Apparatus for testing amplifiers having input and output terminals comprising, input and output circuits coupled to said terminals, each of said circuits including a coupling transformer, means interconnecting said coupling transformers to provide a feed-back circuit between said input and output circuits, means for adjusting said transformers, a pair of adjustable attenuator means in said feed-back circuit respectively ganged with said transformer adjusting means to compensate for variations in the power-loss in said feed-back circuit caused by varying the adjustment of said transformers, other adjustable attenuator means for varying the power-loss in said feed-back circuit, means for indicating the adjustment of said other attenuator means, and oscillation-detector means coupled to said feed-back circuit.

2. Apparatus for testing amplifiers having input and output terminals comprising, input and output circuits coupled to said terminals, each of said circuits including a coupling transformer, means interconnecting said coupling transformers to provide a feed-back circuit between said input and output circuits, said interconnecting means including an amplifier for compensating for power losses in said transformers, means for adjusting said transformers, a pair of adjustable attenuator means in said feed-back circuit respectively ganged with said transformer adjusting means to compensate for variations in the power-loss in said feed-back circuit caused by varying the adjustment of said transformers, other adjustable attenuator means for varying the power-loss in said feed-back circuit, means for indicating the adjustment of said other attenuator means, and oscillation-detector means coupled to said feed-back circuit.

MATTHEW CONRAD.

REFERENCES CITED

The following references are of record in the file of this patent:

UNITED STATES PATENTS

| Number | Name | Date |
|---|---|---|
| 1,831,744 | Laurent | Nov. 10, 1931 |
| 2,109,325 | Thal | Feb. 22, 1938 |
| 2,478,750 | De Muth | Aug. 9, 1949 |
| 2,486,776 | Barney | Nov. 1, 1949 |